United States Patent [19]
Kraft

[11] Patent Number: 4,477,212
[45] Date of Patent: Oct. 16, 1984

[54] CUTTING TOOL

[75] Inventor: Harald Kraft, Uhingen, Fed. Rep. of Germany

[73] Assignee: Feldmühle Aktiengesellschaft, Düsseldorf, Fed. Rep. of Germany

[21] Appl. No.: 413,465

[22] Filed: Aug. 31, 1982

[30] Foreign Application Priority Data

Sep. 15, 1981 [DE] Fed. Rep. of Germany ....... 3136502

[51] Int. Cl.³ .............................................. B26D 1/00
[52] U.S. Cl. ..................................... 407/104; 407/98; 407/109; 407/112
[58] Field of Search .............. 407/102, 103, 107, 109, 407/111, 112, 48, 104, 98, 108, 110

[56] References Cited

U.S. PATENT DOCUMENTS 2,716,801 9/1955 Kraus ..................................... 407/48
3,754,309 8/1973 Jones et al. .......................... 407/107

FOREIGN PATENT DOCUMENTS 2166991 4/1977 Fed. Rep. of Germany ...... 407/112
1246464 9/1971 United Kingdom ............... 407/109

Primary Examiner—Leonidas Vlachos
Attorney, Agent, or Firm—Toren, McGeady and Stanger

[57] ABSTRACT

A cutting tool, such as a turning tool, includes a clamping holder on which a clamping shoe is secured. The clamping shoe has a curved surface projecting member adjacent one end for securing a cutting bit in a recess in a first surface on the clamping holder. The projecting member seats within a shaped recess in the cutting bit. Guide cams are located adjacent the opposite end of the clamping shoe and contact a second surface on the clamping holder inclined relative to the first surface. A clamping bolt located between the projecting member and the guide cams secures the clamping shoe to the clamping holder. A spring encircling the bolt biases the clamping shoe outwardly from the clamping holder. A pin member is mounted in the second surface of the clamping holder and engages between the guide cams as protection against turning the clamping shoe about the axis of the clamping bolt.

9 Claims, 15 Drawing Figures

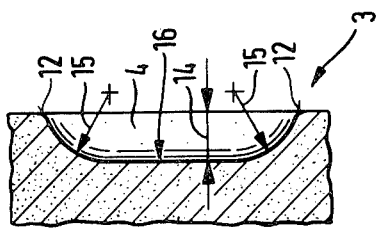
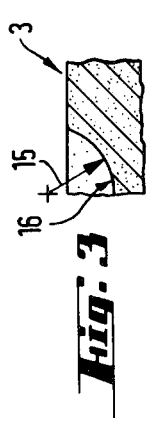
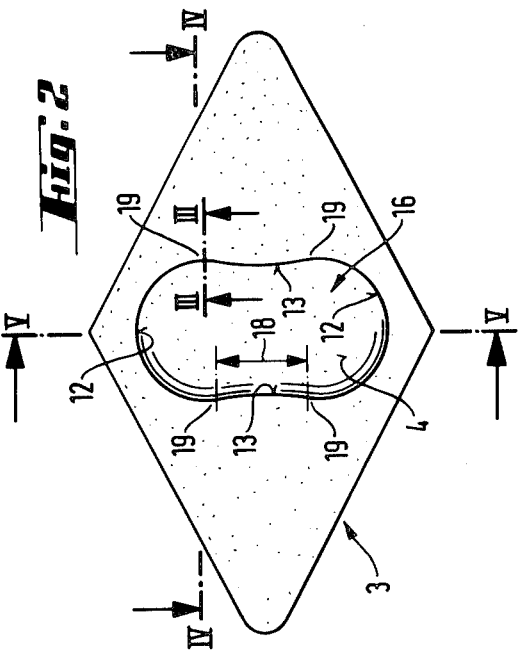
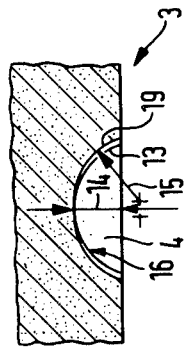

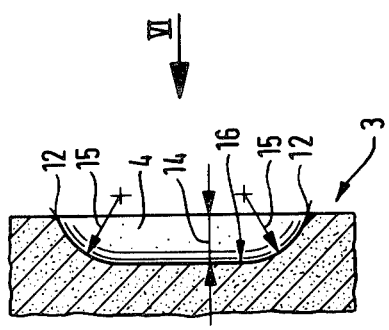
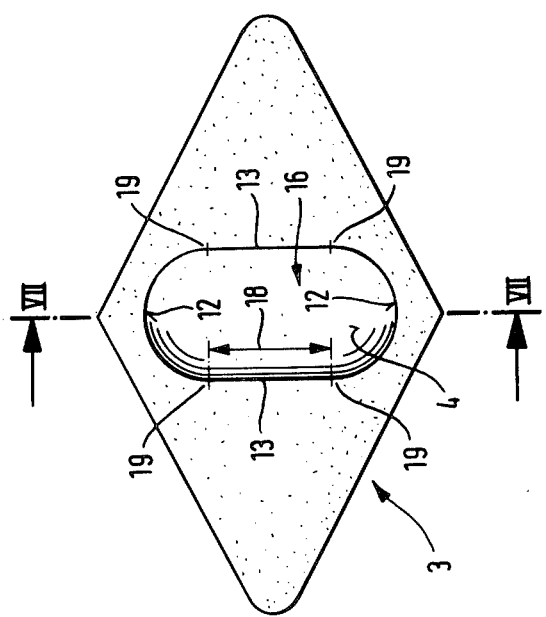

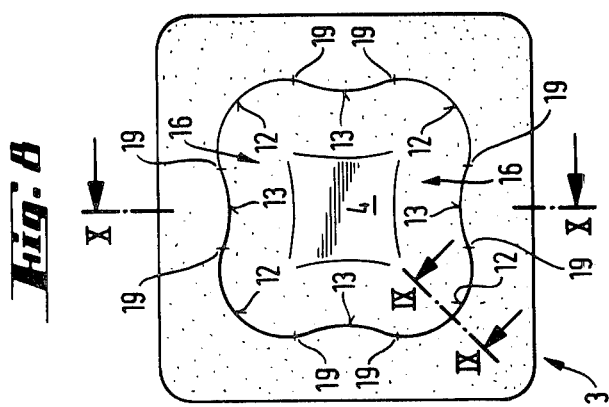
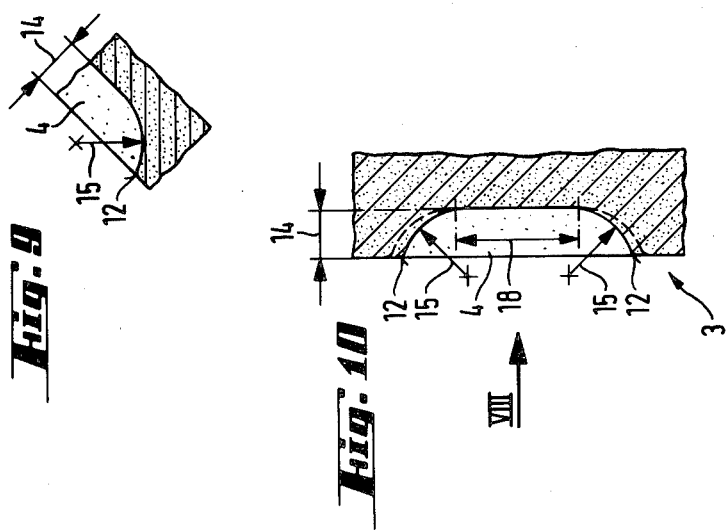

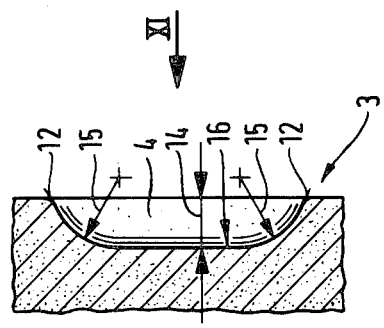
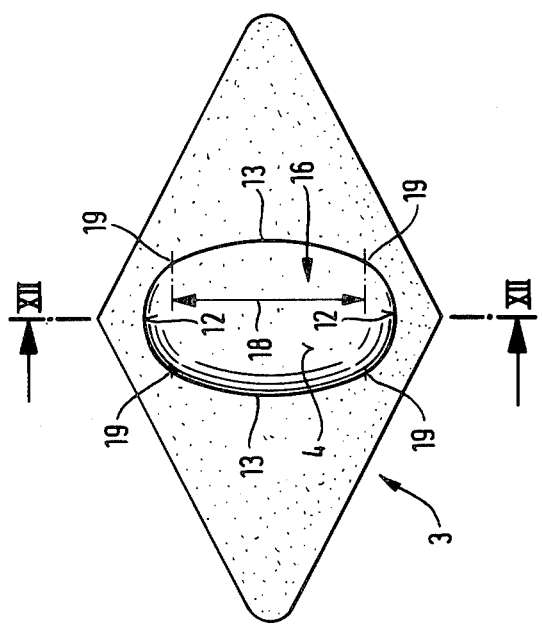

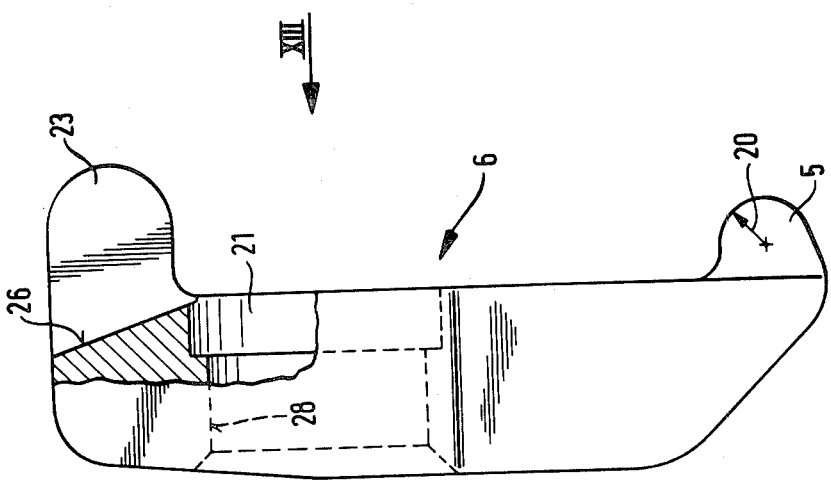
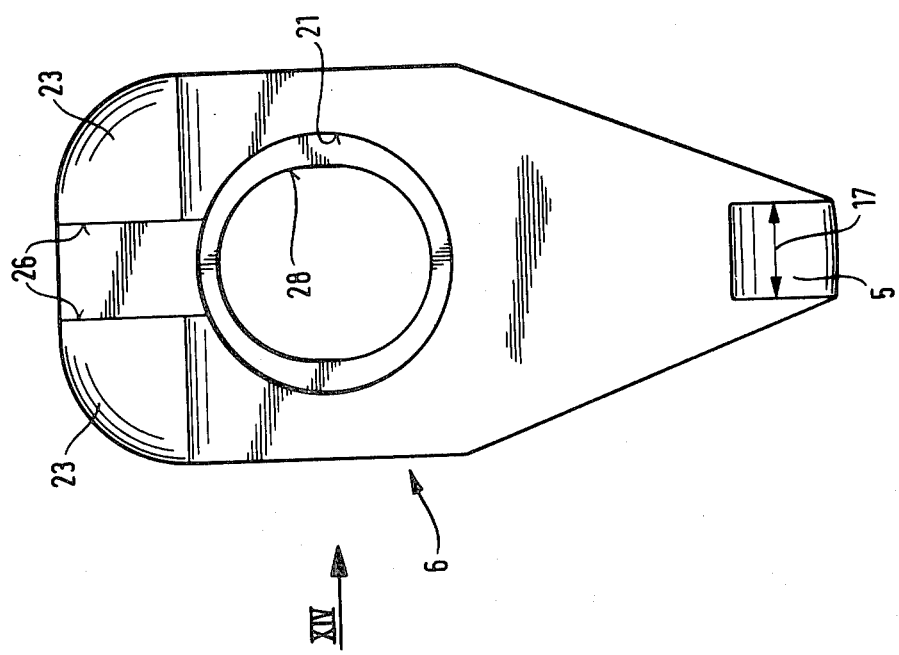

CUTTING TOOL

SUMMARY OF THE INVENTION

The present invention is directed to a cutting tool, such as a turning tool or lathe, made up of a clamping holder with a recess in one surface for receiving a cutting bit. The cutting bit has a depression into which a projecting member on a clamping shoe seats and the clamping shoe is secured to the clamping holder by a clamping bolt.

A cutting tool of this general type is disclosed in Federal Republic of Germany Offenlegungsschrift No. 26 20 201. The tool includes a cutting plate or bit with a depression or recess on its upwardly facing side and the depression extends substantially parallel to the underside of the clamping shoe and the projecting member on the shoe presses against the cutting plate in the depression so that there is a flat support of the clamping shoe in the depression. The pressure exerted by the clamping shoe extends parallel to the axis of the clamping bolt which tightens the shoe against the clamping holder. Due to such construction, no draw cuts can be performed with the tool under a high load if large chip cross-sections are to be removed, since the cutting plate becomes displaced in the holder recess. Moreover, it cannot be assured that the cutting bit always maintains the same seat when it is replaced, since the user must exercise case to assure that it is inserted accurately into the holder recess.

Where cutting bits are exposed to small loads, and where such small loads may be mechanical or thermal loads, it is usual to provide the cutting bit with a through-hole, generally conically shaped in which a threaded pin engages, with the pin having a frusto-conically shaped head. By tightening the pin, the cutting bit is pressed against stop faces on the holder and is fixed in position against any displacement. Such an arrangement is disclosed in U.S. Pat. No. 3,341,923. Such through-holes or openings, however, generally weaken the cutting bits so that large chip cross-sections cannot be worked at high temperatures or with strong pressures, since such conditions would tend to break the cutting bit. Therefore, it is the primary object of the present invention to prevent breakage of the cutting bit.

Another problem in conventional clamping holders is that difficulties are experienced in inserting and adjusting the cutting bits during overhead rotation. When the clamping shoe is removed it adjusts itself and presses against another point on the cutting bit so that it is not possible to assure an optimum clamping effect, moreover, the cutting tool operator usually does not know with absolute certainty whether he has inserted the cutting bit correctly. Therefore, frequently it is the practice to replace the entire clamping holder when a clamping bit is worn out.

Therefore, it is a primary object of the present invention to provide a cutting tool having an exchangeable cutting bit or insert in which the cutting bit is held during a draw cut and is automatically brought into its fixed position during overhead cuts as well as when the cutting bit is replaced.

The objects of the present invention are achieved in a cutting tool embodying the following characterizing features:

a. A projecting member on the clamping shoe engages within a depression in the cutting bit.

b. The clamping shoe and/or the clamping holder has a countersunk recess in which a lifting spring is positioned.

c. The clamping shoe has guide cams in engagement with a sloping surface on the clamping holder.

d. The clamping holder includes a member engageable between the guide cams on the clamping shoe to protect against any tendency of the clamping shoe to rotate.

Since the projecting member on the clamping shoe engages in the depression in the cutting bit, the bit can be removed by displacing the clamping shoe. At a location spaced from the projecting member, the clamping shoe has guide cams which engage a surface on the clamping holder which slopes relative to the surface in which the cutting bit is seated. When the clamping shoe is tightened onto the clamping holder, the guide cams slide along the sloping surface of the holder and the cutting bit and the clamping shoe along with it move into the recess in the surface of the clamping holder where they are properly positioned. Due to the sloping surface of the clamping holder on which the guide cams slide, the required positions of the cutting bit and of the clamping shoe are achieved. When the clamping shoe is released, it moves outwardly from the clamping holder due to the biasing action of the lifting spring. As a result, the guide cams are positioned outwardly from the sloping surface of the clamping holder, though the projecting member on the clamping shoe is still in engagement with the depression in the cutting bit. In this position, the member secured to the clamping holder extending between the guide cams on the clamping shoe prevents any turning or rotation of the clamping shoe about its connection to the clamping holder. In this position it is possible to tilt the clamping shoe and move its projecting member out of the depression in the surface of the cutting bit. With the cutting bit released by the clamping shoe, it can be removed manually from the clamping holder and replaced with another bit, although it will be still be held by the clamping shoe in the overhead position even after the clamping bolt is loosened. Since the cutting bit adjusts itself when the clamping bolt is tightened, this arrangement is especially suited for positions where it is difficult to gain access and where an extension of the clamping holder was necessary in the past.

In a preferred embodiment of the invention, the projecting member of the clamping shoe is in the form of a half barrel to ensure a punctiform contact of the projecting member in the depression in the cutting bit. It is even more advantageous if the projecting member on the clamping shoe is in the form of a half cylinder. In each case it is a prerequisite that the depression in the cutting bit is substantially spherically shaped. With this particular configuration of the depression in the cutting bit, it is possible to use oxide ceramic materials, such as aluminum oxide or zirconium oxide, as the material for the cutting bit with the depression being formed such that it does not cause any weakening and result in any breakage of the cutting bit. For a considerable period of time oxide ceramic materials have been compressed into cutting bits and subsequently sintered. In the past, however, it has not been possible to provide such cutting bits with recesses or depressions which enable a centering contact when the bits are exposed to high loads. When the depression in the cutting bit is spherically formed, no sharp edges are present and the oxide ceramic powder forming the bit flows more easily during the pressing process. Accordingly, the cutting bit is uniformly compressed, that is, a uniform pressure is applied during the pressing operation and this leads to a uniform density over the entire cross-section of the cutting bit. As a result, the cutting bit is more resistant to breakage and, at the same time, the spherical form of its depression ensures that a centering engagement of the bit by the clamping shoulder can be effected.

In a preferred embodiment, the invention provides that the projecting member of the clamping shoe is in punctiform contact with a surface defined by the shape of the depression in the bit. The surface of the depression in the bit is formed as straight or convex lines when a half-barrel shaped projection member is used and as concave lines when a half-cylinder shape of the projecting member is employed.

As a result, the clamping shoe does not contact the cutting bit in a flat manner, such as shown in Federal Republic of Germany Offenlegungsschrift No. 26 20 201 nor in the linear form as in U.S. Pat. No. 3,341,923. Instead, a punctiform contact is afforded. As is shown, oxide ceramic materials withstand great pressure strains so that large forces can be transmitted through a punctiform area without any negative effects on the cutting bit. In contrast, such materials are more susceptible to bending stresses and to tensile stresses, and this factor must be taken into account.

The application of punctiform pressure results, from the construction of the clamping shoe and the shaped configuration of the depression in the cutting bit. After the cutting bit is inserted into the recess of the clamping holder, the projecting member on it engages in the depression in the bit when the clamping holder is tightened so that the projecting member is in punctiform contact with the surface of the depression. By further tightening the clamping shoe against the clamping holder, pressure is exerted. The contact point within the depression in the cutting bit shifts further downwardly. At the same time, the guide cams slide on the sloping surface of the clamping holder in the downward direction. A laterally acting force develops and displaces the cutting bit in the direction of the border of the recess in the clamping holder so that the cutting bit is adjusted. By further tightening the clamping bolt on the clamping shoe, the cutting insert is firmly secured in the adjusted position.

In an advantageous embodiment of the invention, the depth of the depression in the cutting bit is defined by a radius which is greater than the depth. As a result, a relatively flat recess, rounded on all sides, is provided which, as mentioned above, is very advantageous in the production of the cutting bits, does not affect the strength of the cutting bit and, at the same time, enables the centering support of the bit.

Another advantageous feature of the invention is that the width of the projecting member on the clamping shoe is equal to or less than the distance between the convexly curved end portions of the depression in the bit. In accordance with the invention it is possible to permit higher tolerances in the construction of the clamping holder and the clamping shoe. In the clamping holder, due to this construction, the opening or borehole which receives the clamping bolt for the clamping shoe need not be related to the recess in the clamping holder with absolute accuracy. By providing a point-support for the projecting member on the clamping shoe in connection with the larger dimensioning of the depression, the possibility results that the projecting member has sufficient play to adjust itself at the center of pressure, even if it engages in the depression at a varied angle because of manufacturing tolerances.

Another preferred feature of the invention is that the maximum radius of the half-barrel shaped or half-cylinder shaped projecting member on the clamping shoe is in the range of 60 to 80% of the dimension of the radius of the surfaces in the depression in the cutting bit. In accordance with the invention, the machining accuracy in the production of the clamping holder and of the clamping shoe can be reduced. Further, it is possible to form the clamping shoe in a casting process.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 2 is a plan view of a prismatic cutting bit having a depression formed by convex lines and concave lines;

FIG. 3 is a partial sectional view taken along line III—III in FIG. 2;

FIG. 4 is a partial sectional view taken along line IV—IV in FIG. 2;

FIG. 5 is partial sectional view taken along line V—V in FIG. 2;

FIG. 6 is a cutting bit similar to the one shown in FIG. 2, however, the depression is defined by convex lines or arcs and straight lines;

FIG. 7 is a partial sectional view taken along line VII—VII in FIG. 6;

FIG. 8 is a plan view of a substantially square cutting bit with a star-shaped depression;

FIG. 9 is a partial sectional view taken along the line IX—IX in FIG. 8;

FIG. 10 is a partial sectional view taken along line X—X in FIG. 8;

FIG. 11 is a plan view of a rhombic-shaped cutting bit with the depression in the bit defined by convex lines;

FIG. 12 is a partial sectional view taken along the line XII—XII in FIG. 11;

FIG. 13 is a bottom view of the clamping shoe;

FIG. 14 is a side view, partly in section, of the clamping shoe; and

DETAIL DESCRIPTION OF THE INVENTION

Figure 1:
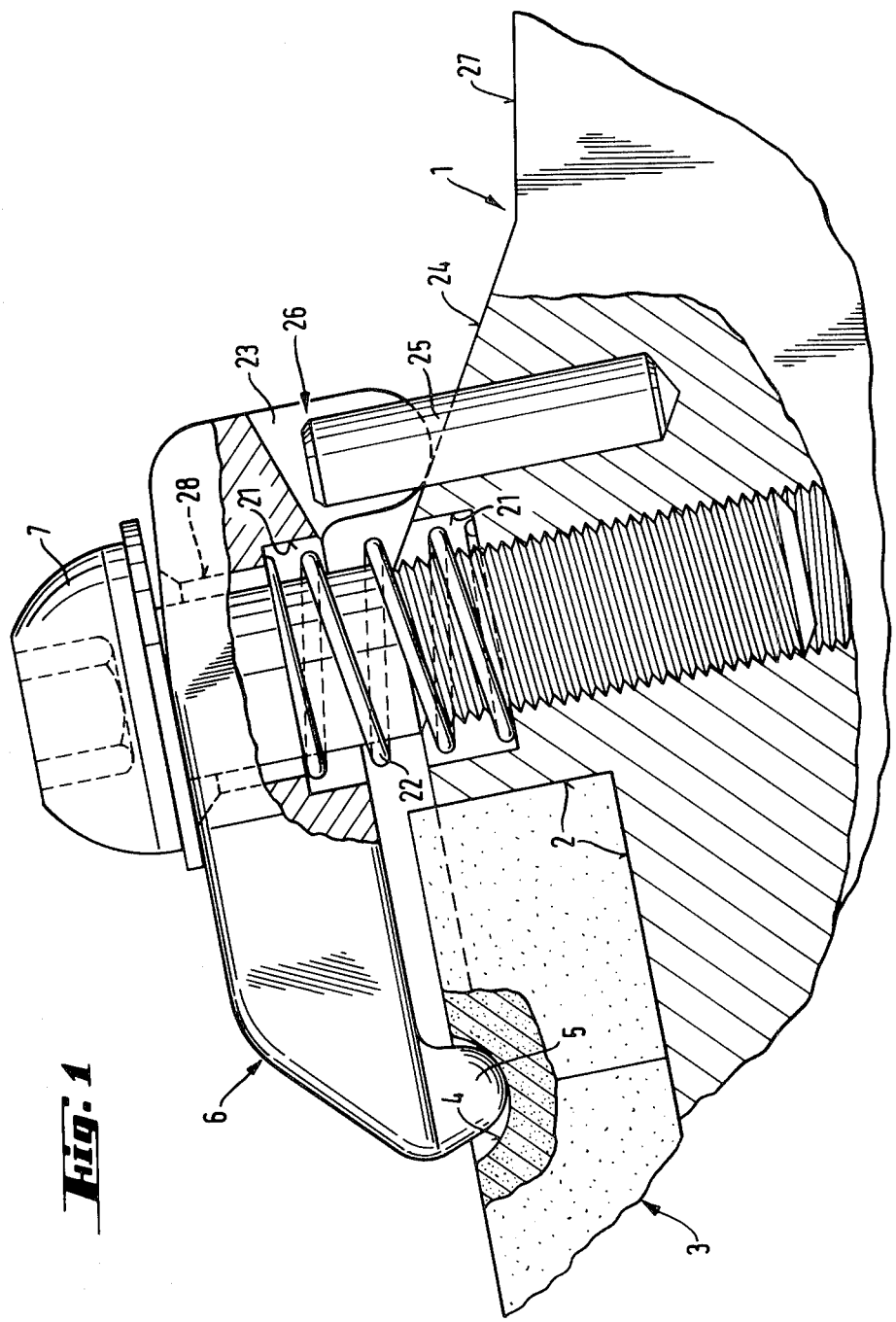
FIG. 1 is a side view, partly in section, of a clamping holder, a clamping shoe and a cutting bit embodying the present invention.
Figure 15:
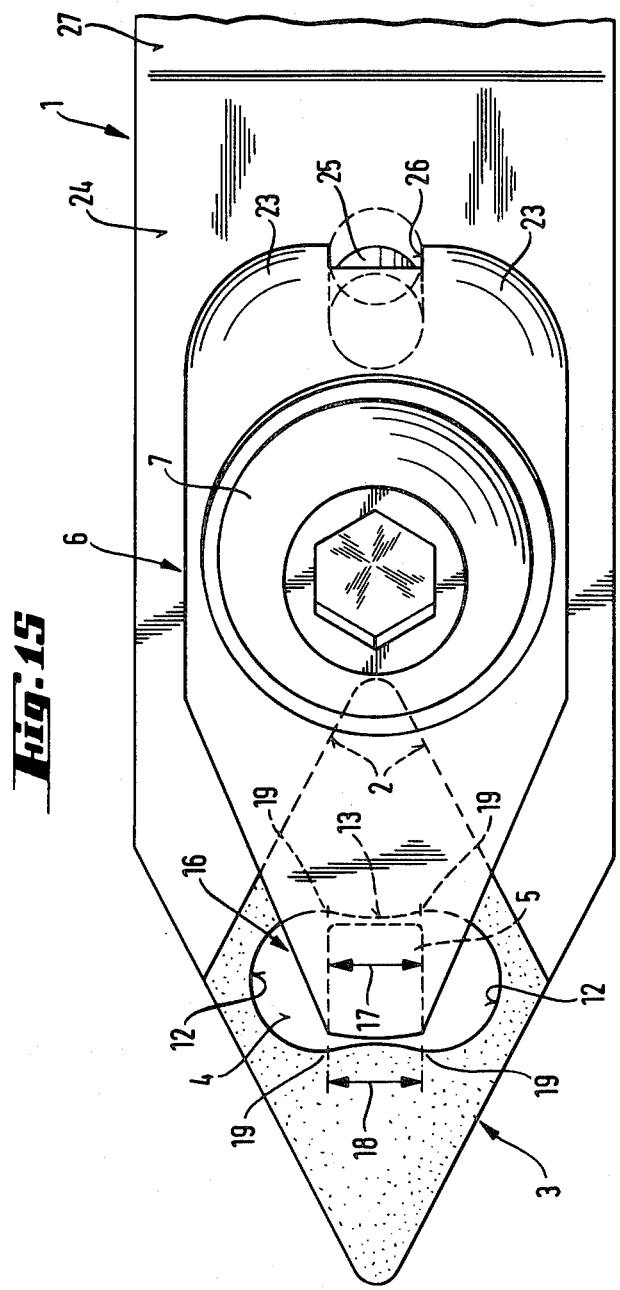
FIG. 15 is a plan view of the assembled clamping holder, clamping shoe, clamping bolt and cutting bit.

In FIGS. 1 and 15, a clamping holder 1 is illustrated. The clamping holder 1 has a recess 2 in one of its surfaces and a cutting bit 3 is positioned in the recess. A centering recess or depression 4 is formed in the cutting bit 3 and a projecting member 5 on the clamping shoe 6 seats in punctiform contact within the depression. The clamping shoe 6 is connected by a clamping bolt 7 to the clamping holder 1. In the various embodiments of the cutting bit 3 shown in FIGS. 2-12, the same reference numerals are used and convexly curved lines 12 define the opposite ends of the depressions 4. At the transition point 19, the convex lines 12 change over to concave lines 13, note FIG. 2. The maximum depth 14 of the depressions 4 is formed by a radius 15 having its center point located outside of the cutting bit 3 so that the maximum depth 14 is less than the radius 15. Because of the formation of the bottom of the depression 4 as a radius surface 16 the bottom has an arched configuration. The distance 18 is the dimension between the transition points 19.

As shown in FIG. 15, the projecting member 5 extending downwardly from the clamping shoe 6 has a width or dimension 17 equal to or less than the dimension 18 extending between the transition points 19 of the convex lines 12 located at the opposite ends of the depression 4.

The clamping shoe is secured to the clamping holder 1 by the clamping bolt 7 which extends downwardly through the clamping shoe into a threaded hole in the clamping holder. In the facing surfaces of the clamping holder 1 and the clamping shoe 6 through which the clamping bolt 7 extends, there are countersunk recesses 21 each providing an annular space around the clamping bolt with the bottom of the countersunk recess forming a shoulder. A lifting spring 22 encircles the clamping bolt 7 and extends between the two countersunk recesses 21 so that the spring bears against the bottom of each of the recesses. The lifting spring 22 biases the clamping shoe outwardly from the clamping holder. While the projecting member 5 is located at one end of the clamping shoe 6, at the other end and also directed toward the clamping holder 1 are a pair of guide cams 23 spaced laterally apart forming a channel 26 between them. As shown in FIG. 1, the guide cams 23 are in bearing contact with a surface 24 sloping or inclined relative to the surface of the clamping holder in which the recess 2 for the clamping bit 3 is formed. At the lower end of the sloping surface 24 a horizontally extending shaft 27 of the clamping holder 1 extends outwardly away from the cutting bit. A blind bore extends downwardly from the inclined surface 24 into the clamping holder 1 in generally parallel relation with the clamping bolt 7. A cylindrical pin 25 is inserted in closely fitting contact with the blind bore so that an axially extending part of the pin projects upwardly from the surface 24 between the guide cams 23. The diameter of the cylindrical pin 25 corresponds to the width of the channel 26 formed between the facing surfaces of the guide cam 23. The cylindrical pin 25 prevents the clamping shoe from turning or rotating about the axis of the clamping bolt 7 while permitting sliding movement of the guide cams 23 relative to the cylindrical pin. When the clamping bolt 7 is backed out of the threaded hole in the clamping holder 1, the lifting spring 22 displaces the clamping shoe so that the guide cams are moved upwardly out of contact with the sloping surface 24 while the projecting member 5 remains in engagement with the depression 4. As shown in FIGS. 1, 13 and 14, the hole 28 in the clamping shoe 6 through which the clamping bolt 7 extends has a larger diameter than the clamping bolt so that the clamping shoe in its released or lifted position can be tipped or tilted with the projecting member 5 moved out of the depression 4 so that the cutting bit 3 can be removed and replaced. When the clamping shoe is lifted the cylindrical pin 25 prevents it from turning about the clamping bolt 7.

While specific embodiments of the invention have been shown and described in detail to illustrate the application of the inventive principles, it will be understood that the invention may be embodied otherwise without departing from such principles.

I claim:

1. A cutting tool, such as a turning tool, comprising a clamping holder having a recess therein, a cutting bit insertable and securable within said recess, said cutting bit having a depression in the surface of said bit facing outwardly from said recess, a clamping shoe mounted on said clamping holder, a projecting member located on and extending outwardly from said clamping shoe so that said projecting member is arranged within said depression for securing said cutting bit on said clamping holder, means for securing said clamping shoe to said clamping holder, said means including a lifting spring for biasing said clamping shoe outwardly from said clamping holder, said clamping holder having a first surface therein containing said recess and a second surface spaced from said recess with said second surface inclined relative to said first surface, said clamping shoe having guide cams thereon disposed laterally spaced apart and spaced from said projecting member, said guide cams being engageable with the inclined said second surface on said clamping holder, means positioned on the second surface of said clamping holder and engageable between said guide cams for preventing the turning of said clamping shoe about said means securing said clamping shoe to said clamping holder, and said depression having a first surface and said projecting member having a second surface, said first and second surfaces disposed in contact when said projecting member is in engagement with said depression, and said first and second surfaces being shaped so that said projecting member is only in punctiform contact with said depression.

2. Cutting tool, as set forth in claim 1, wherein the second surface on said projecting member on said clamping shoe is in the form of a half cylinder extending in the direction transversely of the direction between said projecting member and said guide cams.

3. Cutting tool, as set forth in claim 1, wherein the second surface on said projecting member on said clamping shoe is in the form of a half-barrel shape extending in the direction transversely of the direction between said projecting member and said guide cams.

4. Cutting tool, as set forth in claims 1, 2 or 3, wherein the first surface in said depression in said cutting tool is at least partly spherically shaped.

5. Cutting tool, as set forth in claim 4, wherein the first surface of said depression in said cutting bit is formed with a given radius.

6. Cutting tool, as set forth in claim 5, wherein the given radius of the first surface of said depression is greater than the maximum depth of the first surface of said depression inwardly from the surface of said cutting bit.

7. Cutting tool, as set forth in claims 1, 2 or 3, wherein said depression in said cutting bit is defined at the surface of said cutting bit by convex lines spaced apart and directed toward one another and by other lines interconnecting said convex lines, and the second surface on said projecting member on said clamping shoe is disposed in punctiform contact with the first surface of said depression between the other lines connecting said convex lines.

8. Cutting tool, as set forth in claim 7, wherein the second surface of said projecting member having a width extending in the direction between the convex lines of said depression not greater than the length of the other lines connecting said convex lines.

9. Cutting tool, as set forth in claim 8, wherein the second surface of said projecting member contacting the first surface of said depression in said cutting bit has a maximum radius in the range of 60 to 80% of the radius of the first surface in said depression.

* * * * *